Patented May 18, 1954

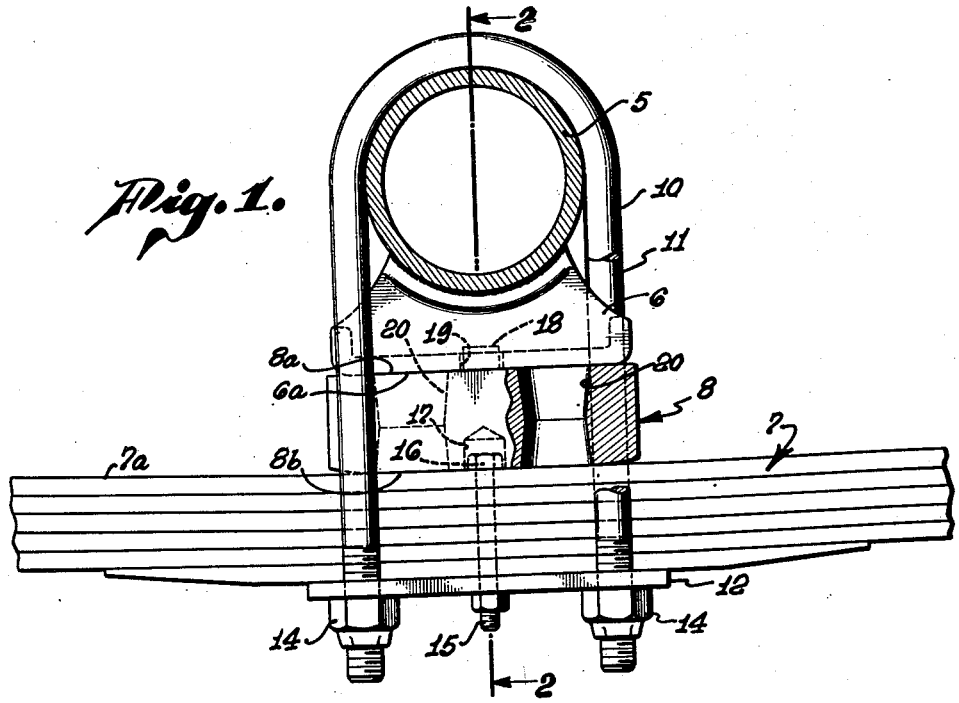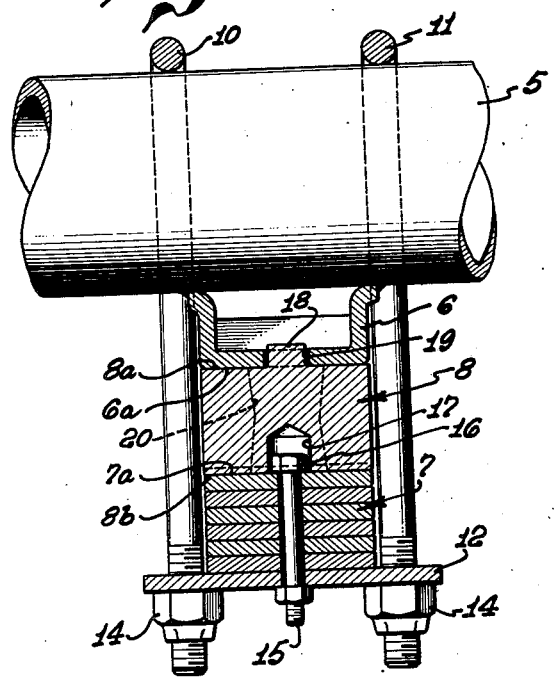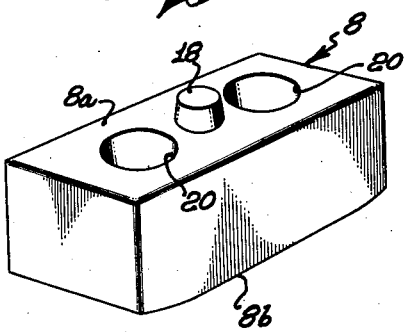

2,678,819

UNITED STATES PATENT OFFICE 2,678,819

AUXILIARY SPRING SEAT

Wilbur L. Douglass, Harbor City, Calif.

Application June 20, 1949, Serial No. 100,227

6 Claims. (Cl. 267—52)

This invention relates to motor vehicle spring suspension systems; more particularly it relates to a device for mounting a vehicle spring in spaced relation with the original spring seat.

It is an object of this invention to provide an improved device of this character.

It is another object of this invention to provide such a device having novel means for correctly locating the spring with respect to the axle.

It is another object of this invention to provide such a device which will result in better spring action and improve the riding qualities of the car.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the accompanying drawing:

Figure 1 is a side elevation of the device installed;

Figure 2 is a cross section, partly in elevation, taken substantially as indicated by line 2—2 of Figure 1; and Figure 3 is a perspective view of the device.

It is sometimes desirable to suspend the frame of an automotive vehicle at a reduced height with respect to the axles, compared with that originally provided, particularly the rear axle. While such change reduces the road clearance to some extent, this is usually not objectionable and there are important advantages resulting from the lowered center of gravity. Thus, for example, the riding qualities are improved, and there is less side roll.

In conventional construction, the rear spring suspension usually comprises a pair of semi-elliptic springs extending respectively beneath the opposite end portions of the rear axle and secured thereto by means of pairs of spring clips or U-bolts which extend over the axle, and clamp the springs to downwardly facing seats or saddles formed on the axle housing. The spring leaves are secured together by a central tie bolt, the bolt head by engagement with an aperture in the saddle serving to position the spring correctly on the axle.

The device of the instant invention comprises a spacer block adapted to be interposed between the saddle and the spring, thus lowering the spring and the rear portion of the frame by an amount substantially equal to the thickness of the block. Spring clips of appropriately greater length also are provided, and the spacer block is arranged to cooperate with the head of the tie bolt and the aperture in the saddle previously mentioned for maintaining the correct relative positioning of the spring and axle. Furthermore, the block is arranged so that the effective length of the spring is increased.

Referring to the drawing, a fragment of a conventional rear axle housing is indicated by the numeral 5 and has a spring saddle 6 attached thereon. The saddle 6 has a downwardly directed face or spring seat 6-$a$ for accommodating a conventional semi-elliptic leaf spring 7 secured thereon in a well understood manner. The seat 6-$a$ being shaped to suit the top surface 7-$a$ of the spring 7 and shown as substantially flat. The device of the invention comprises a generally rectangular block or spacer member 8 adapted to be interposed between the spring 7 and the spring seat 6-$a$ so that the spring 7 is lowered by a distance equal to the thickness of the member 8.

The spring 7 and spacer member 8 are secured to the axle housing 5 by the aid of a pair of U-bolts or spring clips 10 and 11, the legs of which depend respectively on opposite sides of the axle housing 5. These legs pass through suitable holes on an anchor plate 12 on the bottom of spring 7, being threaded at their lower ends for the nuts 14 which when tightened secure the spring 7 and the spacer member 8 together on the spring seat 6.

The spring 7 has a tie bolt 15, the head 16 of which engages an aperture 17 in the bottom of the member 8, the member 8 having a projection or boss 18 aligned therewith which engages an aperture 19 in the saddle 6. In this way the spring 7 and the axle 5 are maintained in the proper relative positions. Thus the block 8 is provided with portions which respectively engage the spring and the spring seat in such a manner that relative longitudinal movement between the block, spring seat, and spring is positively prevented. Through holes 20 may be provided in the member 8 for reducing the weight thereof. The upper face 8-$a$ of the member 8 conforms substantially in length and otherwise to the surface 6-$a$ of the saddle 6. The lower face 8-$b$ likewise provides a surface which engages the upper surface 7-$a$ of the spring 7, but is of reduced length as compared with the surface 6-$a$ by virtue of the end portions which incline upwardly at a small angle with respect thereto, providing clearance above the upper surface 7-a of the spring 7. In this way, the length of that portion of the spring which is restrained against flexing is reduced, the length of those portions free to flex being correspondingly increased, which results in an increased effective strength of the spring.

I claim:

1. In combination, a motor vehicle axle, a spring, means for suspending the spring beneath the axle, said means including a saddle contacting the lower side of said axle, a rigid spacing block mounted between said spring and said saddle, and fastening elements holding said saddle, block and spring assembled to the axle, said block having fixed surfaces respectively contacting said saddle and said spring, portions of the spring-contacting surface of said block being inclined in a direction away from said spring, interengaging means on said saddle and the saddle-contacting surface of said block, for preventing relative movement between said saddle and block, and interengaging means on the spring-contacting surface of said block and said spring.

2. In combination, a motor vehicle axle, a spring, means for suspending the spring beneath the axle, said means including a saddle contacting the lower side of said axle, a rigid spacing block mounted between said spring and said axle, and U-bolts holding said saddle, block and spring assembled to the axle, said block having fixed opposite surfaces respectively contacting said saddle and said spring, a boss on the saddle-contacting surface of said block, said saddle having a depression therein receiving said boss; the spring-contacting surface of said block having a depression substantially aligned with said boss, and a projection on said spring extending into the depression in said spring-contacting surface.

3. An auxiliary seat for a vehicle spring, adapted to be interposed between the spring and an axle of the vehicle, comprising: a rigid block having a pair of fixedly related surfaces adapted to be opposed to the axle and the spring respectively, one of said surfaces having between the margins thereof a depression and being provided adjacent opposite margins with portions inclined with respect to the remainder of the surface, and a boss on the other of said surfaces.

4. An auxiliary seat for a vehicle spring, adapted to be interposed between the spring and an axle of the vehicle, comprising: a rigid block having a pair of fixedly related surfaces adapted to be opposed to the axle and the spring respectively, one of said surfaces having between margins thereof a depression and being provided with portions inclined toward the other surface, and a boss on the other of said surfaces, in substantial alignment with said depression.

5. An auxiliary seat adapted to be interposed between a vehicle spring and an axle-carried seat for the spring, comprising: a rigid block having a pair of fixed surfaces of substantially uniform dimensions adapted to contact the lower side of said axle-carried seat and the upper side of said spring respectively and being substantially equal in length to that of the axle-carried seat, the surface of said block adapted to be opposed to said spring having a depression therein for reception of a projection on the upper side of said spring, and a boss on the other of said surfaces in substantial alignment with said depression for extension into an opening in said seat.

6. An auxiliary seat adapted to be interposed between a vehicle spring and an axle-carried seat for the spring, comprising: a rigid block of generally rectangular form having a pair of fixed surfaces of substantially uniform dimensions adapted to contact said axle-carried seat and said spring respectively and being substantially equal in length to that of the axle-carried seat, one of said surfaces having a depression therein, said one surface having opposite end portions thereof inclined in a direction toward the other of said surfaces, and a boss on the other of said surfaces in substantial alignment with said depression.

References Cited in the file of this patent

UNITED STATES PATENTS

| Number | Name | Date |
| --- | --- | --- |
| 366,425 | Partridge | July 12, 1887 |
| 1,832,617 | Cail | Nov. 17, 1931 |
| 1,899,913 | McCuen | Feb. 28, 1933 |
| 1,901,287 | Corriveau | Mar. 14, 1933 |

FOREIGN PATENTS

| Number | Country | Date |
| --- | --- | --- |
| 345,418 | Great Britain | Mar. 26, 1931 |
| 721,985 | France | Dec. 23, 1931 |